United States Patent
Moradnia et al.

(10) Patent No.: US 12,037,051 B2
(45) Date of Patent: Jul. 16, 2024

(54) FLEXIBLE INNER FENDER UNDERCOVER

(71) Applicant: Honda Motor Co., Ltd., Tokyo (JP)

(72) Inventors: Pirooz Moradnia, Dublin, OH (US); Matthew L Metka, Plain City, OH (US); Derik Thomas Voigt, Dublin, OH (US); Benjamin Bowlby, Dublin, OH (US)

(73) Assignee: HONDA MOTOR CO., LTD., Tokyo (JP)

( * ) Notice: Subject to any disclaimer, the term of this patent is extended or adjusted under 35 U.S.C. 154(b) by 261 days.

(21) Appl. No.: 17/705,963

(22) Filed: Mar. 28, 2022

(65) Prior Publication Data

US 2023/0312028 A1    Oct. 5, 2023

(51) Int. Cl.
*B62D 35/02* (2006.01)
*B60T 5/00* (2006.01)

(52) U.S. Cl.
CPC ............. *B62D 35/02* (2013.01); *B60T 5/00* (2013.01)

(58) Field of Classification Search
CPC .. B60B 7/00; B60B 7/066; B60G 3/00; B62D 25/16; B62D 25/161; B62D 25/163; B62D 25/182; B62D 35/00; B62D 35/005; B62D 35/008; B62D 35/02
USPC ................. 296/180.1, 180.2, 180.3
See application file for complete search history.

(56) References Cited

U.S. PATENT DOCUMENTS

| | | | |
|---|---|---|---|
| 5,054,844 A | 10/1991 | Miwa | |
| 5,954,405 A * | 9/1999 | Toman | B60R 11/00 296/180.1 |
| 7,997,640 B1 * | 8/2011 | Wurm | B62D 25/186 296/180.1 |
| 9,327,778 B2 | 5/2016 | Wolf | |
| 9,415,650 B2 * | 8/2016 | Bromme | B60T 5/00 |
| 9,643,664 B2 * | 5/2017 | Tesch | B62D 35/02 |
| 9,855,984 B2 | 1/2018 | Tesch et al. | |
| 10,124,838 B2 | 11/2018 | Shibutake et al. | |
| 10,246,136 B2 | 4/2019 | Scholz et al. | |
| 10,494,033 B2 | 12/2019 | Haeseker et al. | |
| 10,654,529 B2 | 5/2020 | Butler et al. | |
| 10,899,388 B2 | 1/2021 | Nishida et al. | |
| 2011/0309652 A1 * | 12/2011 | Eichentopf | B62D 35/02 296/180.1 |
| 2018/0162460 A1 * | 6/2018 | Seidler | B62D 35/02 |
| 2019/0111980 A1 * | 4/2019 | Nakamura | B62D 35/02 |
| 2020/0094792 A1 | 3/2020 | Schuemann et al. | |
| 2020/0108684 A1 | 4/2020 | Parry-Williams et al. | |
| 2020/0283072 A1 | 9/2020 | Ballarin | |

(Continued)

FOREIGN PATENT DOCUMENTS

| | | | |
|---|---|---|---|
| DE | 4339112 C1 | 10/1994 | |
| DE | 4324024 A1 | 1/1995 | |
| DE | 102010018779 A1 * | 11/2010 | B60G 7/001 |

(Continued)

*Primary Examiner* — Jason S Daniels (74) *Attorney, Agent, or Firm* — Plumsea Law Group, LLC (57) ABSTRACT

A flexible undercover for a suspension system including an undercover panel configured to be disposed inboard of the wheel assembly, the undercover panel being flexible and configured to expand and contract with movement of the wheel assembly, and an undercover mounting plate connected to an outboard edge of the undercover panel, the undercover mounting plate configured to be attached to the suspension system.

16 Claims, 6 Drawing Sheets

(56) References Cited

U.S. PATENT DOCUMENTS

2021/0078652 A1* 3/2021 Bösl ................ B60G 7/001

FOREIGN PATENT DOCUMENTS

| DE | 102016212267 A1 | 12/2017 |
| --- | --- | --- |
| DE | 102016215032 A1 * | 2/2018 |
| FR | 2961468 A1 | 12/2011 |
| JP | 2005053321 A | 3/2005 |
| JP | 2008030523 A | 2/2008 |
| WO | 202043450 A1 | 3/2020 |

* cited by examiner

FLEXIBLE INNER FENDER UNDERCOVER

BACKGROUND

1. Field of the Disclosure

The present disclosure relates to an inner fender undercover for a vehicle and, more particularly, a flexible inner fender undercover configured for movement with a wheel assembly of the vehicle.

2. Description of Related Art

Generally speaking, the panels mounted inside the front and rear fenders of a vehicle are known as inner fenders or inner fender panels. The inner fenders define the top and inboard side of a large open space, or wheelhouse area, that is sized to accommodate the suspension components necessary to allow the wheel assembly to move and turn within a predetermined wheel envelope. This relatively large open space, however, creates a strong interaction between the airflow along the underbody of the vehicle and the wheel assembly and suspension components disposed within the wheelhouse area. As a result, this airflow interaction increases aerodynamic drag and exposes the suspension components within the wheelhouse area to damage from mud, rocks, gravel, snow, corrosive environments and the like, as encountered when the vehicle is being driven.

There is a need in the art for a system and method that can protect the suspension components within the wheelhouse area while also not impeding the movement of the wheel assembly.

SUMMARY

To overcome this problem, an undercover is positioned inboard of the wheel and is configured to expand and contract in order to accommodate wheel movement, while at the same time protecting the suspension components.

In one aspect, the disclosure provides a vehicle including a vehicle body having an underbody, the vehicle body defining an inner fender, the inner fender forming an opening in the underbody of the vehicle body; a wheel assembly having a rim and a tire, the wheel assembly being positioned within the inner fender; a suspension component disposed within the inner fender, the suspension component coupling the wheel assembly to the vehicle body to permit motion of the wheel assembly relative to the vehicle body; and a flexible undercover disposed inboard of the wheel, the flexible undercover configured to move with the suspension component such that the flexible undercover expands and contracts with movement of the wheel assembly.

A system and method for a flexible undercover for a wheel assembly includes an undercover panel configured to be disposed inboard of the wheel assembly, the undercover panel being flexible and configured to expand and contract with movement of the wheel assembly; and an undercover mounting plate connected to an outboard edge of the undercover panel, the undercover mounting plate configured to be attached to the wheel assembly.

In another aspect, an undercover assembly includes a wheel assembly including a tire and a rim having an inner diameter; and a flexible undercover disposed inboard of the wheel assembly, the flexible undercover configured to move relative to the wheel assembly such that the flexible undercover expands and contracts with movement of the wheel assembly.

Other systems, methods, features and advantages of the disclosure will be, or will become, apparent to one of ordinary skill in the art upon examination of the following figures and detailed description. It is intended that all such additional systems, methods, features and advantages be included within this description and this summary, be within the scope of the disclosure, and be protected by the following claims.

BRIEF DESCRIPTION OF THE DRAWINGS

The disclosure can be better understood with reference to the following drawings and description. The components in the figures are not necessarily to scale, emphasis instead being placed upon illustrating the principles of the disclosure. Moreover, in the figures, like reference numerals designate corresponding parts throughout the different views.

DETAILED DESCRIPTION

The strong interaction between the airflow along the underbody of the vehicle and the wheel assembly and suspension components disposed within the wheelhouse area increases aerodynamic drag and exposes the suspension components within the wheelhouse area to damage from mud, rocks, gravel, snow, corrosive environments and the like, as encountered when the vehicle is being driven. In accordance with the disclosure herein, a flexible undercover is positioned inboard of the wheel and below the suspension components in the wheelhouse area. The flexible undercover effectively eliminates the large open area suddenly encountered by airflow along the underbody of the vehicle, and thus reduces aerodynamic drag while at the same time protecting the suspension components. In addition, the flexible undercover is configured to expand and contract in order to accommodate wheel movements.

Referring to FIGS. 1-6, a first exemplary embodiment of an inner fender undercover according to the disclosure herein is shown generally by reference numeral 10. The undercover 10 includes an undercover panel 34, generally disposed between the suspension components of a vehicle and the road surface on which the vehicle is being driven (not shown), and a mounting plate 24 which secures the undercover 10 to a vehicle. More particularly, in an exemplary embodiment of the disclosure, the undercover panel 34 is formed with a pleated, accordion-like configuration which allows it to obtain a first configuration and a second configuration, as discussed below, although other configurations could also be utilized in accordance with the disclosure herein. The panel 34 is flexible to allow for wheel turning movements and up/down suspension movements and is formed from, by way of example, an elastomeric or rubber material, or any flexible material capable of maintaining shape under pressure from the air flow under the vehicle.

Figure 1:
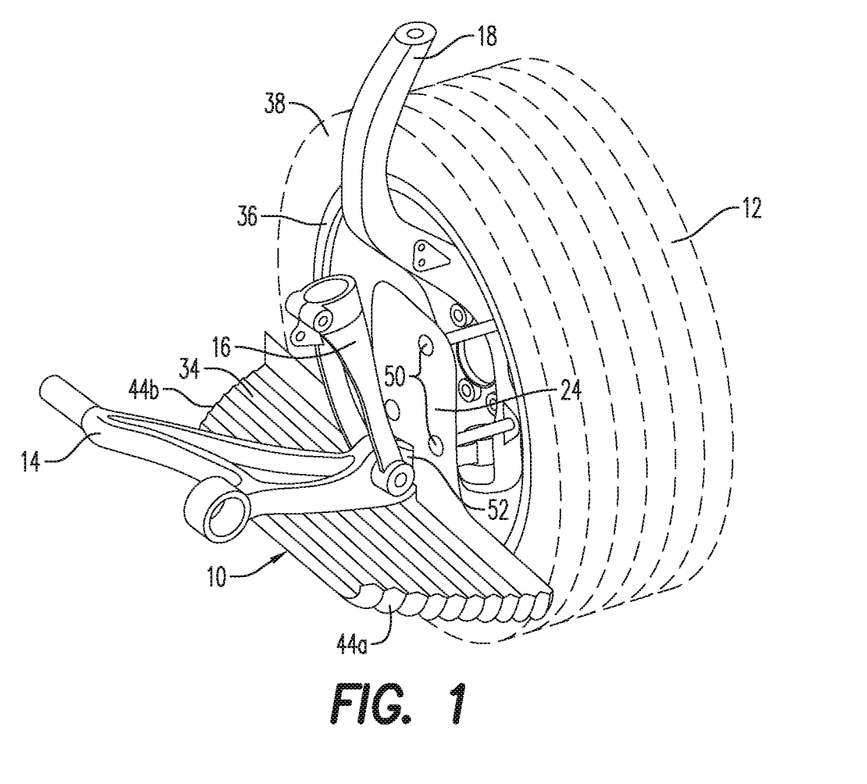
FIG. 1 is a perspective view of a flexible inner fender undercover according to a first exemplary embodiment of the disclosure in a first configuration.

Further, the undercover panel 34 is disposed below the lower suspension arm 14, damper fork 16 and wheel suspension knuckle 18 and the mounting plate 24 is secured to the knuckle 18 by a plurality of fasteners 50 such as, for example, mounting bolts, screws, clips, or other types of fastening mechanisms. The mounting plate 24 extends substantially perpendicular from the outboard edge of the undercover panel 34. The mounting plate 24 further includes a cut-out opening 52 that allows the suspension components 14, 16 to extend therethrough. The inboard edge of the undercover panel 34 can similarly be secured to the wheelhouse/inner fender, subframe, or any other stationary portion of the vehicle body by a mounting plate (not shown) or a ring assembly (as discussed below relative to FIGS. 9 and 10), or other structure. Hence, the flexible undercover 10 covers the inner fender or wheelhouse opening from underneath the vehicle in order to protect the vehicle components from impact by gravel, snow, rocks and other road debris, so as to reduce corrosion of the vehicle components. Further, the flexible undercover 10 blocks or impedes the flow of air from entering the inner fender area from below the vehicle and thus improves the overall aerodynamics of the vehicle.

The front or leading end 44a of the undercover panel defines an "attack edge" when the vehicle is in motion. The thickness of the leading end 44a may vary from the remainder of the undercover panel 34; that is, the leading end 44a can be thicker than the remainder of the undercover panel 34 in order to add strength and durability. The contour or shape of the leading end 44a may also vary, such as the front radius edge best shown in FIGS. 1 and 3, or the leading end 44a could also have a front tapered or beveled edge, for example. When the vehicle 10 is in motion, air flow separation beneath the underbody 20 may occur due to the gaps in the shape of the underbody 20 upstream of the inner fenders 22. The thicker attack edge of the leading end 44a is useful to facilitate reattachment of air flow which has separated in the gaps upstream of inner fenders 22.

Figure 2:
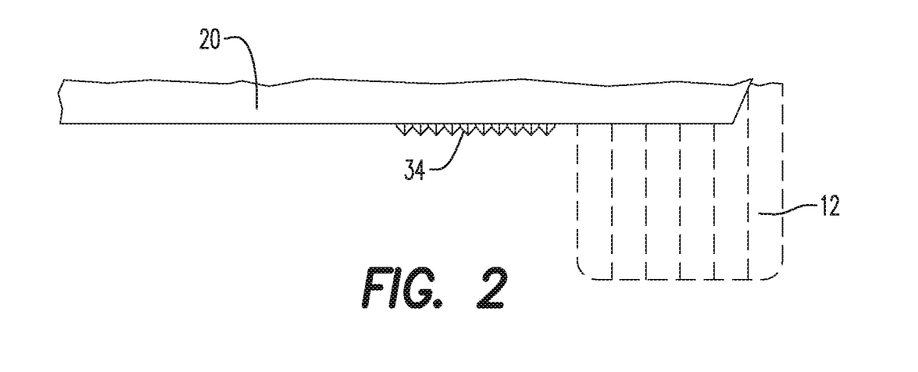
FIG. 2 is a front view of the flexible inner fender undercover shown in FIG. 1.
Figure 3:
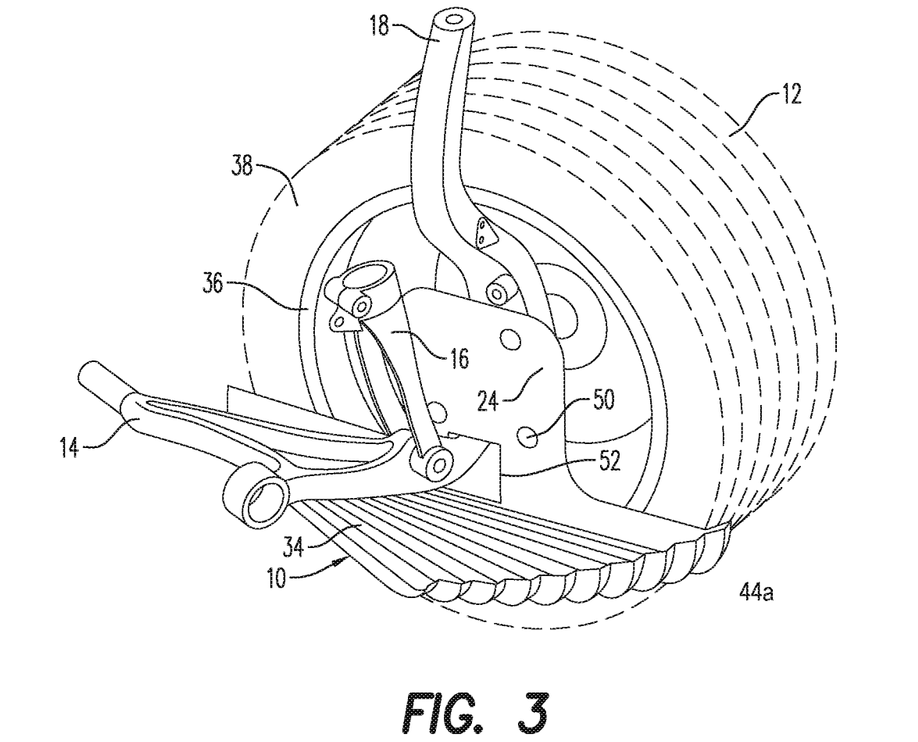
FIG. 3 is a perspective view of the flexible inner fender undercover shown in FIG. 1 in a second configuration.
Figure 4:
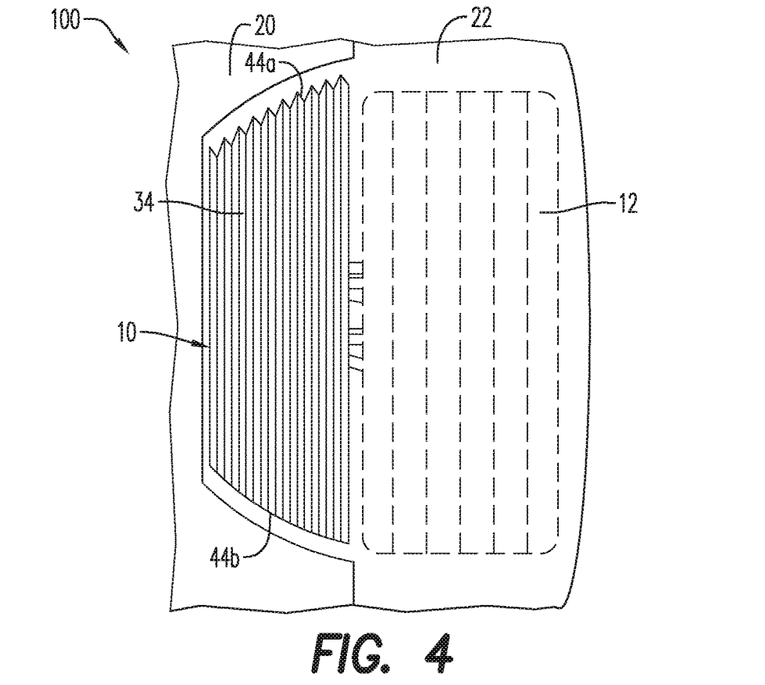
FIG. 4 is a bottom view of the flexible inner fender undercover shown in FIG. 1 with the wheel straight.
Figure 5:
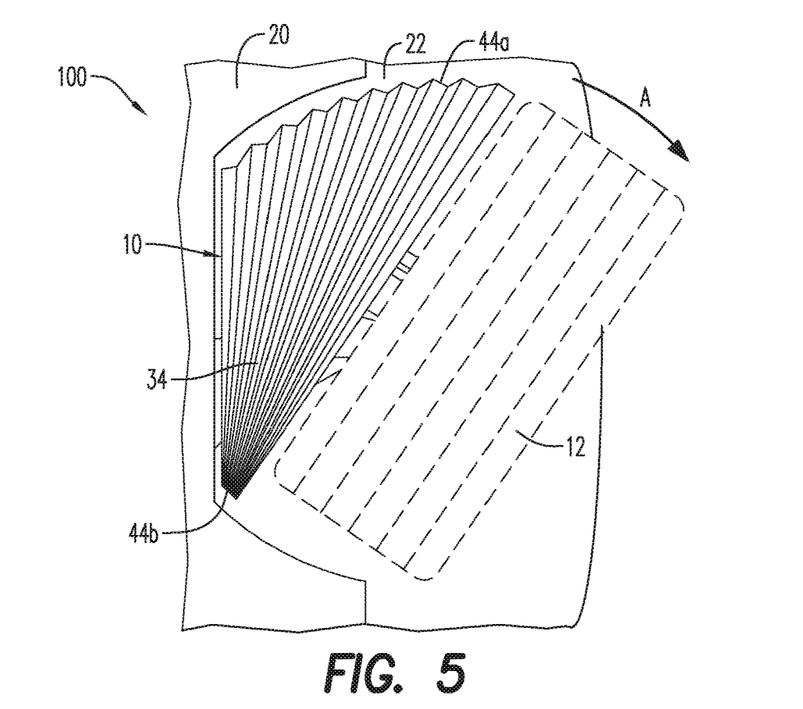
FIG. 5 is a bottom view of the flexible inner fender undercover shown in FIG. 1 with the wheel turned to expand the flexible inner fender undercover.
Figure 6:
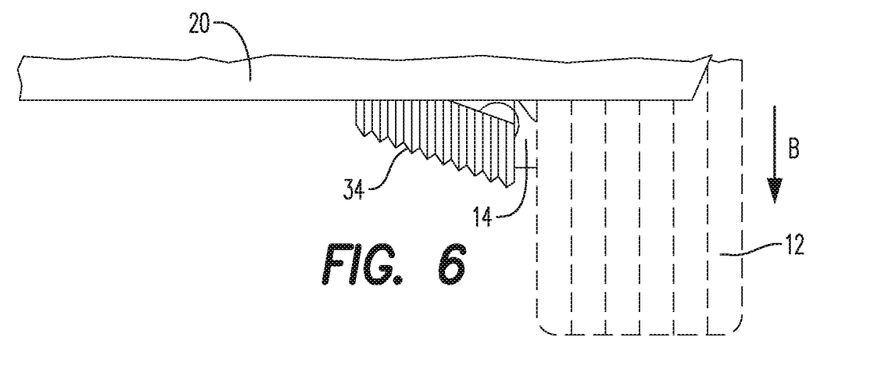
FIG. 6 is a front view of the flexible inner fender undercover shown in FIG. 1 with the wheel straight and an increased suspension ride height.

As shown in FIGS. 1, 2 and 4, when the vehicle 100 is travelling or parked with the wheels 12 in a generally straight position aligned with a longitudinal axis of the vehicle 100 and a normal suspension ride height, i.e., on a generally flat road surface, the undercover panel 34 has a first configuration and is disposed generally horizontal and parallel to the underbody 20 of the vehicle 100. Referring also to FIGS. 3 and 5, however, when the wheels 12 are turned the undercover panel 34 also turns with the wheels 12 since it is mounted on the wheel knuckle 18 and the accordion-like pleats of the undercover panel 34 obtain a second configuration. More particularly, when the wheel assembly 12 is turned in an outwardly direction as shown by arrow A in FIG. 5, the leading end 44a of the undercover panel 34 expands as the pleats are extended, while the trailing or second end 44b of the undercover panel 34 contracts as the pleats are compressed together. The expanded leading end 44a thus defines a larger radius than the trailing end 44b and the undercover panel 34 has a second configuration with a compressed trailing end 44b and an expanded leading end 44a resembling the appearance of a handheld fan.

If the road surface is generally flat when the wheels are straight or when the wheels are turned, undercover 34 will maintain a horizontal position that is generally parallel to the underbody 20 of the vehicle 100. However, if the vehicle 100 encounters a change in road surface height, such as when driving over a speed bump, the suspension ride height changes. As shown best in FIG. 6, since the undercover panel 34 is flexible, it can accommodate the increased or changed suspension ride height by expansion of the accordion-like pleats in a transverse direction of the vehicle. In this instance, the undercover 34 is no longer generally parallel to the underbody 20 of the vehicle. The opening or cut-out area 52 in the mounting plate 24 (see FIG. 1) provides sufficient clearance for the vertical movement of the suspension components 14, 16 when a change of suspension ride height is encountered, while the mounting plate 24 assists in maintaining the shape of the flexible undercover 10.

Figure 7:
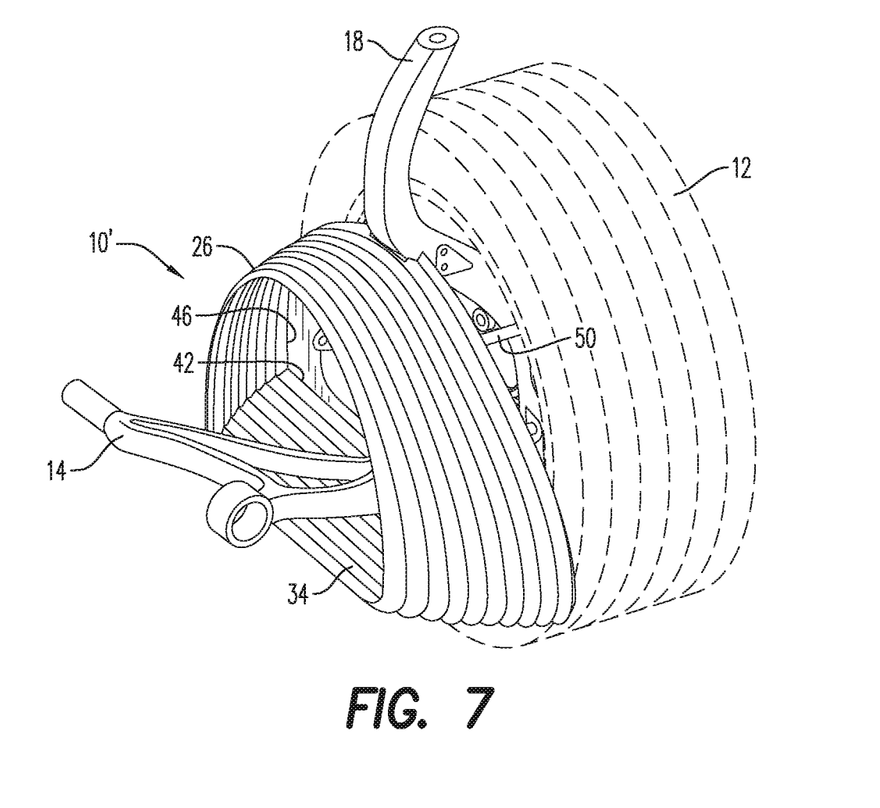
FIG. 7 is a perspective view of a flexible inner fender undercover according to a second exemplary embodiment of the disclosure.
Figure 8:
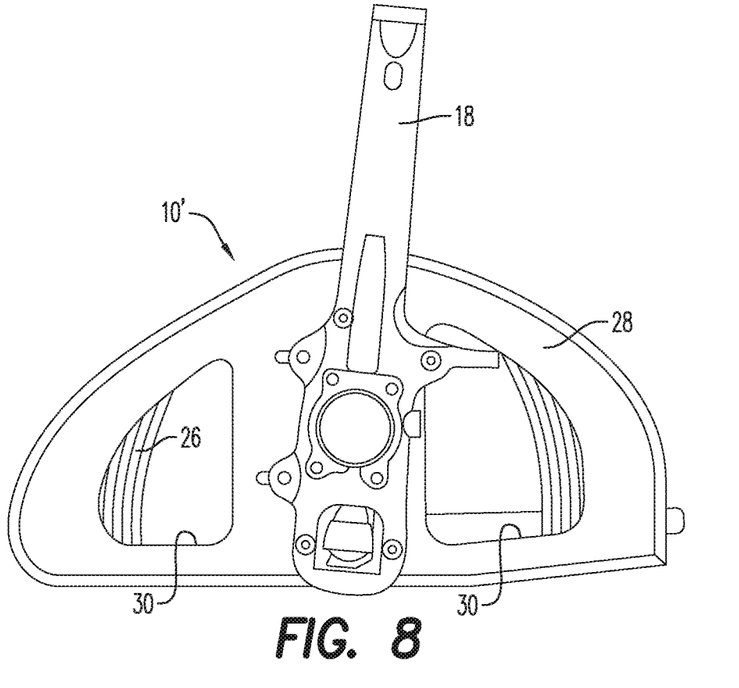
FIG. 8 is an outboard view of the flexible inner fender undercover shown in FIG. 6.

Referring to FIGS. 7 and 8, a second exemplary embodiment of an inner fender undercover according to the disclosure herein is shown generally by reference numeral 10'. The undercover 10' similarly includes an undercover panel 34, generally disposed between the suspension components of a vehicle and the road surface on which the vehicle is being driven (not shown). The undercover 10' further includes a top portion or upper panel 26 extending from the forward and rear ends 44a, 44b of the undercover panel 34 so as to define a full, closed loop undercover 10'. An end plate 28 is provided having an overall shape generally corresponding to the shape of the closed loop defined by the undercover panel and upper panel 26. The end plate 28 extends substantially perpendicular from the outboard edge 42 of the undercover panel 34. The end plate 28 is secured at a lower edge to the outboard edge 42 of the undercover panel 34 and at the sides to the outboard edge 46 of the upper panel 26. The end plate 28 is substantially rigid or solid to maintain the shape of the closed loop undercover 10' and secure the undercover 10 to a vehicle.

More particularly, in an exemplary embodiment of the disclosure, the undercover panel 34 and upper panel 26 are formed with a pleated, accordion-like configuration which allows the closed loop undercover 10' to obtain a first configuration and a second configuration, similar to those discussed above for the first exemplary embodiment. The panels 34 and 26 are flexible to allow for wheel turning movements and up/down suspension movements and are formed from, by way of example, an elastomeric or rubber material, or any flexible material capable of maintaining shape under pressure from the air flow under the vehicle. Further, the undercover panel 34 is disposed below the lower suspension arm 14, damper fork 16 and wheel knuckle 18 and the upper panel 26 extends over the top of the lower suspension arm 14 and damper fork 16, thereby surrounding the suspension components. The end plate 28 is secured to the knuckle 18 by a plurality of fasteners 50 such as, for example, mounting bolts, screws, clips, or other types of fastening mechanisms. Hence, the flexible undercover 10' surrounds the suspension components within the inner fender or wheelhouse opening in order to further protect them from impact by gravel, snow, rocks and other road debris, so as to reduce corrosion of the vehicle components.

In addition, as best shown in FIG. 8, the outboard end plate 28 further includes one or more cut-out through openings 30 that allow for cooling airflow to the brakes (not shown) when the vehicle 100 is in motion.

Figure 9:
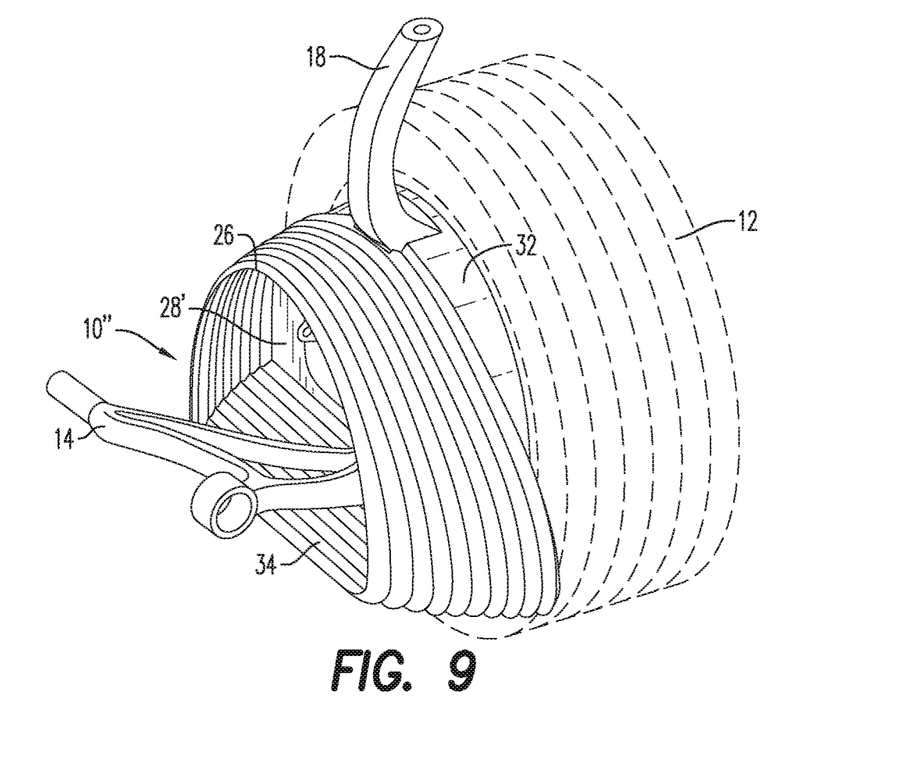
FIG. 9 is a perspective view of a flexible inner fender undercover according to a third exemplary embodiment of the disclosure.
Figure 10:
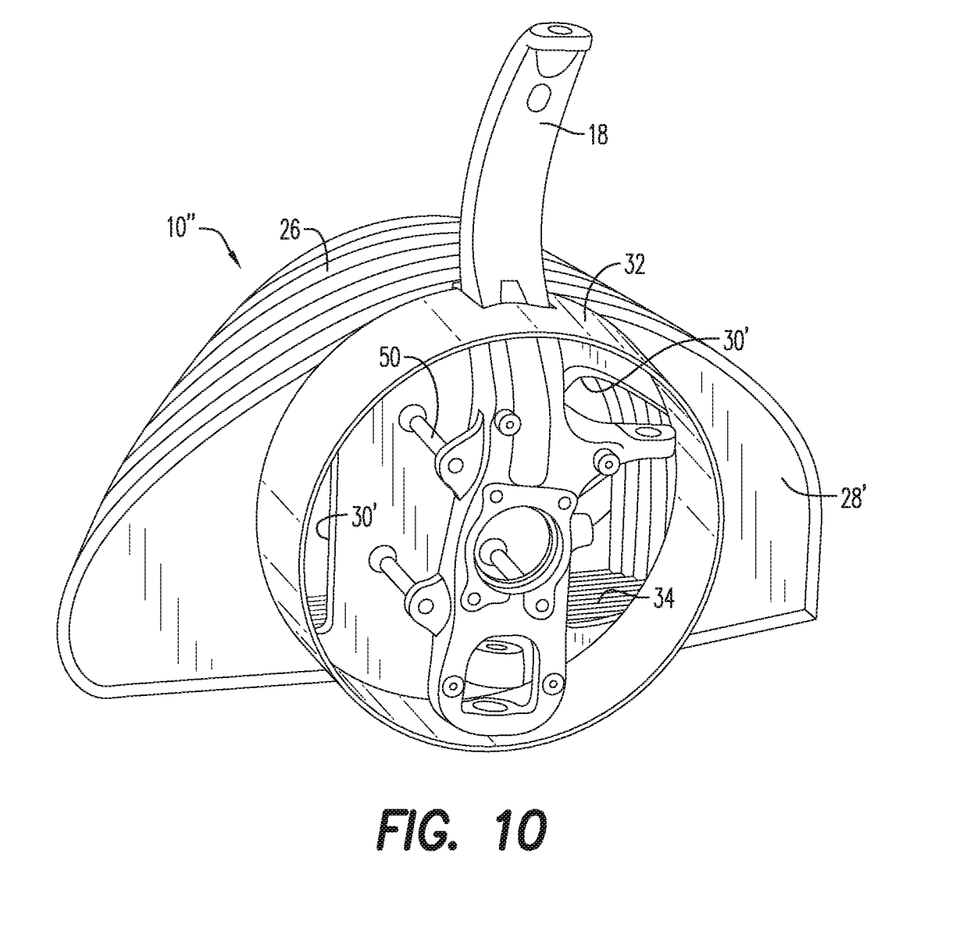
FIG. 10 is an outboard view of the flexible inner fender undercover shown in FIG. 9.

A modification of the second exemplary embodiment of the inner fender undercover is shown generally in FIGS. 9 and 10 by reference numeral 10″. Similar to the above described second embodiment, the undercover 10″ includes an undercover panel 34, generally disposed between the suspension components of a vehicle and the road surface on which the vehicle is being driven (not shown) and an upper panel 26 extending from the forward and rear ends 44a, 44b of the undercover panel 34 so as to define a closed loop. The undercover 10″ also includes an end plate 28′ having an overall shape generally corresponding to the shape of the closed loop defined by the undercover panel 34 and upper panel 26. The end plate 28′ is secured at a lower edge to the outboard edge of the undercover panel 34 and at the sides to the outboard edge of the upper panel 26. The end plate 28′ is substantially rigid or solid to maintain the shape of the closed loop undercover 10″ and secure the undercover 10″ to a vehicle. The end plate 28′ also has one or more cut-out through openings 30′ that allow for cooling airflow to the brakes (not shown) when the vehicle 100 is in motion.

In addition to the above similar features, the undercover 10″ is modified to further include an outer ring or extension member 32 disposed outwardly from the end plate 28′ and into the rim 36 of the wheel assembly 12. The diameter of the outer ring 32 is dimensioned to be slightly less than an inner diameter of the rim 36 of the wheel 12 such that a radial gap is defined between the outer ring 32 and the inner surface of the wheel assembly 12. The depth of the outer ring 32 relative to the wheel assembly 12 will vary depending upon a number of factors, including for example, but not limited to, the geometry of the vehicle, the underbody surface quality and the wheel design. Generally, the deeper (i.e., longer) the outer ring 32 extends into the rim 36, the more protected the wheel's interior surfaces will be from the outside airflow. The outer ring 32 can extend to a suspension component contained inside of the wheel space (i.e., a brake component) or the outer ring could also extend beyond the wheel space in other situations such as, for example, in open rims, wide rims, underbody cover or brake duct configurations designed to direct air to the inner fender, or the like. Hence, the outer ring 32 can be just a short, relatively shallow extension or it can cover the entire available inner width of the wheel. In either instance, the outer ring 32 covers at least a portion of the inner surface of the rim 36 and assists in diverting snow, dirt, gravel, stones, and the like, away from the inner surface of the rim 36 so as to reduce the possibility of damage and reduced wear.

While various embodiments of the disclosure have been described, the description is intended to be exemplary, rather than limiting and it will be apparent to those of ordinary skill in the art that many more embodiments and implementations are possible that are within the scope of the disclosure. Accordingly, the disclosure is not to be restricted except in light of the attached claims and their equivalents. Also, various modifications and changes may be made within the scope of the attached claims.

We claim:

1. A vehicle comprising:
   a vehicle body having an underbody, the vehicle body defining an inner fender, the inner fender forming an opening in the underbody of the vehicle body;
   a wheel assembly having a rim and a tire, the wheel assembly being positioned within the inner fender;
   a suspension component disposed within the inner fender, the suspension component coupling the wheel assembly to the vehicle body to permit motion of the wheel assembly relative to the vehicle body; and
   a flexible undercover disposed inboard of the wheel, the flexible undercover configured to move with the suspension component such that the flexible undercover expands and contracts with movement of the wheel assembly;
   wherein the flexible undercover extends in a closed loop around the suspension component.

2. The vehicle according to claim 1, wherein the flexible undercover is disposed below the suspension component and configured to cover the opening of the inner fender inboard of the wheel assembly.

3. The vehicle according to claim 2, wherein the suspension component includes a suspension knuckle and the flexible undercover includes a mounting plate configured to be attached to the suspension knuckle.

4. The vehicle according to claim 1, wherein the suspension component includes a suspension knuckle and the flexible undercover includes an end plate configured to maintain a shape of the closed loop and to be attached to the suspension knuckle.

5. The vehicle according to claim 4, wherein the end plate includes at least one brake cooling opening.

6. The vehicle according to claim 1, wherein the flexible undercover further includes an outer ring configured to be disposed within the rim.

7. A flexible undercover for a suspension system comprising:
   an undercover panel configured to be disposed inboard of a wheel assembly, the undercover panel being flexible and configured to expand and contract with movement of the wheel assembly; and
   an undercover mounting plate connected to an outboard edge of the undercover panel, the undercover mounting plate configured to be attached to the suspension system;
   wherein the undercover mounting plate extends substantially perpendicular from the outboard edge of the undercover panel.

8. The flexible undercover according to claim 7, further comprising an undercover top portion extending from opposing side edges of the undercover panel, the undercover top portion being flexible and forming a flexible closed loop together with the undercover panel.

9. The flexible undercover according to claim 8, wherein the undercover mounting plate defines an end plate including at least one brake cooling opening.

10. The flexible undercover according to claim 9, further comprising an outer ring extending from the end plate and configured to be disposed within the wheel assembly.

11. The flexible undercover according to claim 7, wherein the undercover panel has a pleated configuration.

12. An undercover assembly for a vehicle comprising:
   a wheel assembly including a tire and a rim having an inner diameter; and
   a flexible undercover disposed inboard of the wheel assembly, the flexible undercover configured to move relative to the wheel assembly such that the flexible undercover expands and contracts with movement of the wheel assembly;
   wherein the flexible undercover has a pleated body such that, when the wheel assembly turns in a predetermined direction, a first edge of the flexible undercover is configured to expand and a second edge of the flexible undercover is configured to be compressed; and wherein the pleated body extends in a closed loop.

13. The undercover assembly according to claim 12, wherein the flexible undercover includes a mounting plate configured to be attached to a suspension knuckle of a vehicle.

14. The undercover assembly according to claim 12, wherein the flexible undercover includes an end plate attached to an outboard side edge of the closed loop and configured to attach the flexible undercover to a suspension knuckle of a vehicle.

15. The undercover assembly according to claim 14, wherein the end plate includes at least one brake cooling opening.

16. The vehicle according to claim 14, wherein the flexible undercover further includes an outer ring extending from the end plate and configured to be disposed within the inner diameter of the rim.

* * * * *